United States Patent
Tarraf

(12)
(10) Patent No.: US 6,434,198 B1
(45) Date of Patent: Aug. 13, 2002

(54) METHOD FOR CONVEYING TTY SIGNALS OVER WIRELESS COMMUNICATION SYSTEMS

(75) Inventor: Ahmed A. Tarraf, Bayonne, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,417

(22) Filed: Aug. 28, 1998

(51) Int. Cl.[7] .............................................. H04B 3/00
(52) U.S. Cl. ...................................................... 375/259
(58) Field of Search ................................ 375/259, 242, 375/354, 369, 365; 370/342, 335, 320, 304, 305; 379/52, 93.18, 93.17, 53; 345/1, 123; 455/342

(56) References Cited

U.S. PATENT DOCUMENTS

| | | | | |
|---|---|---|---|---|
| 5,910,967 A | * | 6/1999 | Vanderaar | 375/265 |
| 5,974,116 A | * | 10/1999 | Engelke et al. | 379/52 |
| 5,982,853 A | * | 11/1999 | Liebermann | 379/52 |
| 6,188,429 B1 | * | 2/2001 | Martin et al. | 348/15 |

\* cited by examiner

Primary Examiner—Chi Pham
Assistant Examiner—Khai Tran
(74) Attorney, Agent, or Firm—Claude R. Narcisse

(57) ABSTRACT

A method for conveying information-carrying teletype signals over a wireless telecommunication system by encoding the information into a repetitive signal. Teletype information is derived from part of a received signal encoded as a repetitive signal which part has been determined not to have been adversely affected by the wireless telecommunication system.

24 Claims, 4 Drawing Sheets

METHOD FOR CONVEYING TTY SIGNALS OVER WIRELESS COMMUNICATION SYSTEMS

CROSS REFERENCES

This application is related to a commonly assigned and concurrently filed application entitled "Apparatus and Method for Conveying TTY Signals Over Wireless Telecommunication Systems" filed on Aug. 28, 1998 with Ser. No. 09/143,416.

BACKGROUND OF THE INVENTION

1. Field of the Invention

The present invention provides a method for conveying teletype information over a wireless communication system and more particularly to a method in which the teletype information is encoded so that it can be reliably conveyed over the wireless telecommunication system.

2. Description of the Related Art

Teletype terminals are part of telecommunication technology developed more than 30 years ago. The teletype terminals are equipment that were designed to transmit and receive teletype signals where such teletype signals contain information arranged in accordance with a well known signaling protocol such as Baudot signaling. A signaling protocol is a set of rules followed by a provider of a communication system that defines how information is to be encoded, transmitted, received and decoded by equipment of the communication system. The Baudot signaling protocol has remained virtually unchanged for the past 30 years. Baudot signaling is an analog signaling protocol in which analog signals are used to digitally encode information that are conveyed over a telephony system such as the Public Switched Telephone Network (PSTN).

There are still many active teletype terminals in the United States and throughout the world. Many of these active terminals still transmit and receive information in accordance with the 45.45 baud Baudot analog signaling protocol or other similar protocols. In the 45.45 baud Baudot signaling protocol, each character is coded as an 8 bit block of information comprising 1 start bit, 5 information bits and 2 stop bits where each bit is 22 milliseconds in length. Thus, 45.45 baud (1/22 msec.) represents the speed at which the information is conveyed and can be generally referred to as the information rate. The actual information is represented by the 5 information bits. The start bit, which is usually defined as a "0" bit and the stop bits, which are usually defined as "1" bits, indicate the beginning and end of each 8 bit block of information respectively. For many signaling protocols, including the Baudot signaling protocol, the 8 bit block of information usually represents an alphanumeric character. An 8 bit block of information is commonly referred to as an 8 bit word. The start and stop bits are typically referred to as synchronization bits and are part of signaling information. Signaling information is information used by the system that enable the system to properly transmit, receive and process the user information. The Baudot signaling protocol being an analog signal protocol, each bit is represented by a tone (i.e., a single frequency sinusoid). Thus, a "0" bit is represented by an 1800 Hz tone and a "1" bit is represented by a 1400 Hz tone.

With the advent of wireless telecommunication systems, owners of teletype terminals have attempted to transmit and receive teletype signals over such systems. Moreover, the Federal Communications Commission (FCC) has adopted rules requiring providers of wireless telecommunication systems to ensure that teletype users can access Emergency 911 services over wireless telecommunication systems. The Emergency 911 services are the well known types of services typically provided via the PSTN (or other communication network) in which a subscriber of the PSTN simply dials 911 to obtain emergency assistance from local authorities (e.g., police dept., fire dept., hospital/ambulance services). However, system providers have discovered that the teletype terminals have performed poorly over wireless telecommunication systems. One indication of poor performance is the ratio of the number of erroneous characters received to the total number of characters transmitted; this ratio is known as the Character Error Rate (CER). Several studies and trials conducted by various wireless equipment manufacturers confirm the poor performance (e.g., unacceptably high CER) of teletype communications over wireless telecommunication systems. The following are some of the more recent studies: E911 TDD Compatibility Testing With IS-136, Jan. 22, 1998, Ericsson Corp.; E911 TDD Compatibility to GSM, 1998, Ericsson Corp.; TTY Study using Vocoder direct link Gallaudet University Technology Assessment Program; TTY/TDD Compatibility Measurements Preliminary Results", May 1998, Nokia Corp.; TDD Communications over CDMA September 1997, Qualcomm Inc.; "Initial TTY Report" May 1998, Sprint PCS.

It is widely thought that the poor performance of teletype communications over wireless telecommunication systems is due to the use of vocoders in such systems. Vocoders are speech coding systems designed to represent human voice as mathematical models comprising various parameters. Also, vocoders comprise speech coding systems that simply digitize analog voice signals into Pulse Coded Modulation (PCM) samples (i.e., bit streams) without any mathematical parameter modeling. The parameters are transmitted and received over wireless telecommunication channels. At the transmit end, a vocoder produces a set of parameters for every basic timing interval of the wireless telecommunication system. The basic timing interval is part of a format being followed by a wireless telecommunication system. The format is a particular method of arranging and structuring information to be conveyed over a wireless telecommunication system. The basic timing interval is a period of time during which a block of information representing, for example, voice, data, video and other communication signals, is conveyed. For certain wireless telecommunication systems such as Code Division Multiple Access (CDMA) wireless telecommunication systems, the basic timing interval is commonly referred to as a frame. Each frame contains a plurality of digital bits representing digitally encoded information. At the receive end, another vocoder uses the received parameters to reproduce human voice. In current CDMA wireless telecommunication systems the frame is 20 milliseconds long and some of the vocoders used are the QUALCOMM Code Excited Linear Predictive Coder (QCELP 13 k or 8 k) and the Enhanced Variable Rate Coder (EVRC).

Signals that do not originate from human speech such as tones are sounds that can adversely impact the quality and accuracy of the mathematical model parameters produced by the vocoders, thus, the ability of a vocoder at the receive end to accurately reproduce such signals would also be adversely affected. Many have reasoned that since teletype signals (i.e., tones) are not sounds typically produced by human voice, some vocoders have difficulty in reproducing such signals resulting in the poor performance of teletype signals when conveyed over wireless telecommunication systems.

However, tests and performance studies have shown that the poor performance of teletype signals conveyed over wireless telecommunication systems is mainly due to the quality of the communication channels of these systems and not to the use of vocoders. The quality of these communication channels may be such that the conveyed teletype signals are damaged to the extent that an unacceptably high information error rate (i.e., high CER) results.

Referring to FIG. 1, there is shown a test setup designed to evaluate the performance of teletype signals over a communication channel of a CDMA system using QCELP 13k vocoders. At the transmit end teletype signals from a teletype terminal (not shown) are fed to vocoder which produces the mathematical model parameters. The parameters produced by vocoder 100 are transmitted as frames over communication channel 102. In this setup, communication channel 102 is designed to be ideal in the sense that the transmitted frames experience no adverse effects. Adverse effects are any existing conditions in the wireless telecommunication system which cause errors to occur in the information being conveyed through the system. A non-zero information error rate, which is usually defined as the ratio of erroneous information to total information, directly results from the adverse effects.

In an actual CDMA wireless telecommunication system, the frames would be transmitted as radio frequency (RF) signals over the air and/or other communication channel media. Depending on the quality of the communication channels being used, a certain percentage of the transmitted frames would be adversely affected and thus such frames (i.e., "bad frames") would contain erroneous bits. Usually, a Frame Error Rate (FER) is associated with a wireless telecommunication system where the FER is typically defined as the ratio of bad frames to the total number of frames transmitted through communication channels of the wireless telecommunication system. Communication channel 102 has a 0% FER. For other wireless communication systems, a corresponding information error rate known as the Bit Error Rate (BER) is an indicator of the quality of the communication channels for those systems.

Vocoder 104 receives the transmitted frames and reproduces the teletype signals whose CER is then measured. It is found that at 0% FER the CER of the teletype signals is also 0% for the test setup of FIG. 1. In a test of an actual CDMA system using a QCELP 13k vocoder it was found that an FER barely under 1% yields a CER of about 7%. The same test conducted for a Time Division Multiple Access (TDMA) wireless telecommunication system, which uses a different type of vocoder known as an Algebraic Code Excited Linear Predictive (ACELP) vocoder, yielded the same results. Similar tests for other types of wireless systems such as Global System for Mobile Communication (GSM) yielded similar results. Moreover, under acceptable communication channel conditions (nearly 0% FER or 0% BER), different types of wireless telecommunication systems (e.g., CDMA, TDMA, GSM, PCS) yielded about a 1% CER for teletype signals. However, for a 1% FER or higher, the CER increased dramatically.

A quantitative analysis of teletype signals transmitted through a less than ideal communication channel of a CDMA wireless telecommunication system further confirms that the dominant cause of the poor performance of the teletype signals is due to the relative quality (manifested by a relatively high PER, or high information error rate) of the communication channel. In particular, for a CDMA wireless telecommunication system, 300 teletype characters were transmitted through a channel whose FER is 1%. The teletype characters complied with the 45.45 baud Baudot signaling protocol. Each frame of the CDMA system is 20 milliseconds long. Therefore the number of frames in 300 characters is 2640 frames (i.e., 300 char.×8 bits/char.×22 msec./bit×(1 frame/20 msec)). A 1% FER is therefore equivalent to 26.4 bad frames for 300 transmitted characters. In a worst case scenario each bad frame produces one bit error in a different character leading to 26.4 character errors. The CER is thus (26.4/300)×100=8.8%. The relationship between the FER and the CER is defined by the formula CER=8.8 FER. Under a typical CDMA system, the average FER is 2% which could result in a CER of up to 17.6% for teletype communications.

Based on the above discussion it is evident that the dominant factor that affects teletype communications over wireless telecommunication systems is the information error rate (e.g., FER, BER) of the system. In order to achieve reliable teletype communications over a wireless telecommunication system, the effect of the system's information error rate on the teletype signals must somehow be attenuated as much as possible.

Therefore, there exists a need to convey (i.e., transmit and receive) teletype information over wireless telecommunication systems in such a manner that any adverse effects (manifested as information errors) on the teletype information due to the quality of the communication channels of the system is substantially attenuated.

SUMMARY OF THE INVENTION

The present invention provides a method for conveying teletype information over a wireless telecommunication system in a reliable manner. Equipment of the wireless telecommunication system receive teletype signals carrying teletype information. The teletype information is encoded as a repetitive signal and is transmitted over the wireless telecommunication system. The repetitive signal is a signal encoded with the teletype information and said coded signal is replicated at least once and concatenated to the original coded signal. The repetitive signal is thus a string of replicated coded signals. The teletype information is thus advantageously repeated within the repetitive signal such that when the repetitive signal is received after having been transmitted over the wireless telecommunication system, the teletype information can still be retrieved from part of the repetitive signal determined as not having been adversely affected by the wireless telecommunication system.

Therefore, equipment of the wireless telecommunication system, such as a base station, are configured to receive teletype signals, repetitive signals carrying teletype information in addition to voice signals and other non-teletype signals. The equipment applies the method of the present invention as follows: First, a signal is received. The received signal is then encoded as a repetitive signal and is transmitted over the wireless telecommunication system when it has been determined that the received signal is a teletype signal. Teletype information is retrieved from portions of the received signal determined as not having been adversely affected by the wireless telecommunication system when it has been determined that the received signal is a repetitive signal carrying teletype information.

DETAILED DESCRIPTION

The present invention provides a method for transmitting and receiving teletype information over a wireless telecommunication system. The teletype information is represented as a repetitive signal. The repetitive signal is generated by first creating a coded signal. The coded signal is created with the use of well known signal characteristics (e.g., amplitude, phase, frequency content) to encode the teletype information. One example of a coded signal is to combine different tones of relatively equal amplitudes into one complex tone signal, i.e., a signal comprising tones of various frequencies where each of said tones represents part of the teletype information. The coded signal is then replicated at least once. The original coded signal and its replica are concatenated to form a signal comprising a string of coded signals which are replicas of each other. Each of said coded signals within the string carries the teletype information. The teletype information is thus replicated within the string of coded signals. The string of replicated coded signals is the repetitive signal. It should be readily understood that the higher the number of replicated coded signals, the more likely that more portions of the repetitive signal is received without having been adversely affected by the wireless telecommunication system.

The repetitive signal is conveyed over the wireless telecommunication system and typically experiences the adverse effects of the system. Due to adverse effects of the system, part of the repetitive signal, after having been conveyed over the system, contains errors. Even if the repetitive signal has been adversely affected by the system, the teletype information can still be determined from part of the repetitive signal determined not to have been adversely affected by the system. Equipment of the wireless telecommunication system are configured to encode the teletype information as a repetitive signal when the equipment has determined that the received signal is a teletype signal. When the equipment determines that the received signal is a repetitive signal carrying teletype information, the equipment derives the teletype information from portions of the received signal determined not to have been adversely affected by the wireless telecommunication system.

Figure 1:
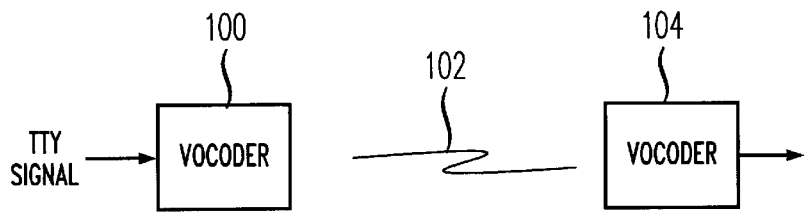
FIG. 1 depicts a test setup for measuring information error rate of a wireless telecommunication system.
Figure 2:
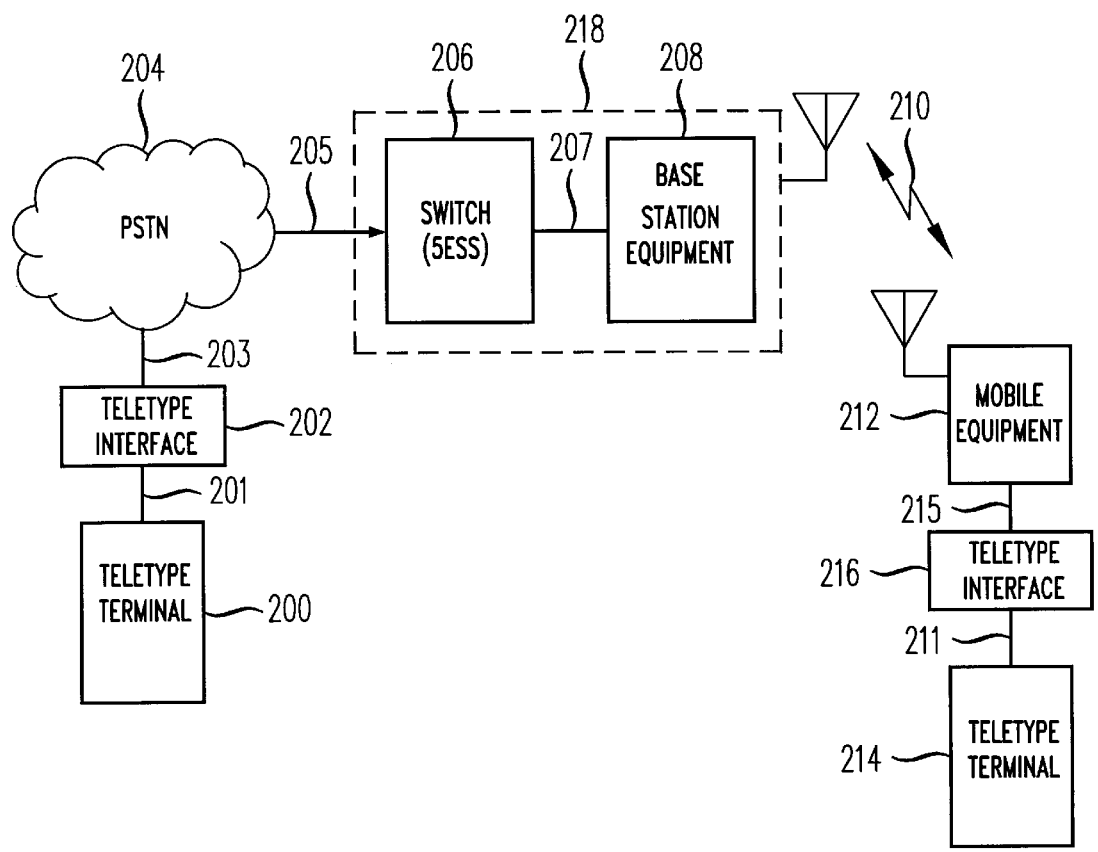
FIG. 2 depicts a typical communication system in which the method of the present invention is practiced.

Referring to FIG. 2, there is shown a typical system for teletype communications over a wireless system. Teletype terminal 200 transmits and receives teletype signals over communication link 201 to teletype interface 202. Teletype interface 202 is any equipment that is able to convert (amplitude and/or power levels adjustments) teletype signals to communication signals suitable for transmission over a telephony system such as the PSTN. Teletype interface 202 also receives communication signals from the PSTN and converts such signals for reception by teletype terminal 200. Teletype signals from terminal 200 propagate through the PSTN and are received by wireless telecommunication equipment 218. The teletype signals are first received by switch 206 which routes the signals to base station equipment 208 via communication link 207. Switch 206 is a well known communication equipment, such as a 5ESS digital switch manufactured and designed by Lucent Technologies of Murray Hill, N.J., that routes communication signals to different communication systems. It should be noted that the method of the present invention is not limited to the use of the 5ESS switch; other switches manufactured and designed by other companies can also be used as part of wireless telecommunication equipment 218. Wireless telecommunication equipment 218 is equipment that is able to transmit and receive signals as RF signals conveyed over wireless communication channel 210. For example, wireless telecommunication equipment 218 comprise RF transmitters and receivers.

Thus, wireless telecommunication equipment 218 represents equipment (owned by a system operator) that receive and transmit signals from various users of a communication system and relay said signals to users of the system in accordance with the protocol and format being followed by the system. For the sake of clarity only one user (mobile equipment 212) is shown. Wireless telecommunication equipment 218 thus receives teletype signals from terminal 200 via communication link 207 and teletype information from terminal 214 via wireless communication channel 210. Wireless telecommunication equipment 218 is thus configured to practice the method of the present invention. The teletype information from terminal 214 is in the form of a repetitive signal in accordance with the method of the present invention. Teletype terminal 214 transmits teletype signals over communication link 211 through teletype interface 215 and to mobile equipment 212 via communication link 215. Mobile equipment 212 is user equipment (e.g., a cellular phone) that is configured to practice the method of the present invention. The teletype signal from terminal 214 is thus represented as a repetitive signal by mobile equipment 212 in accordance with the method of the present invention. The repetitive signal is then transmitted to wireless telecommunication equipment 218 via wireless communication channel 210.

Figure 3:
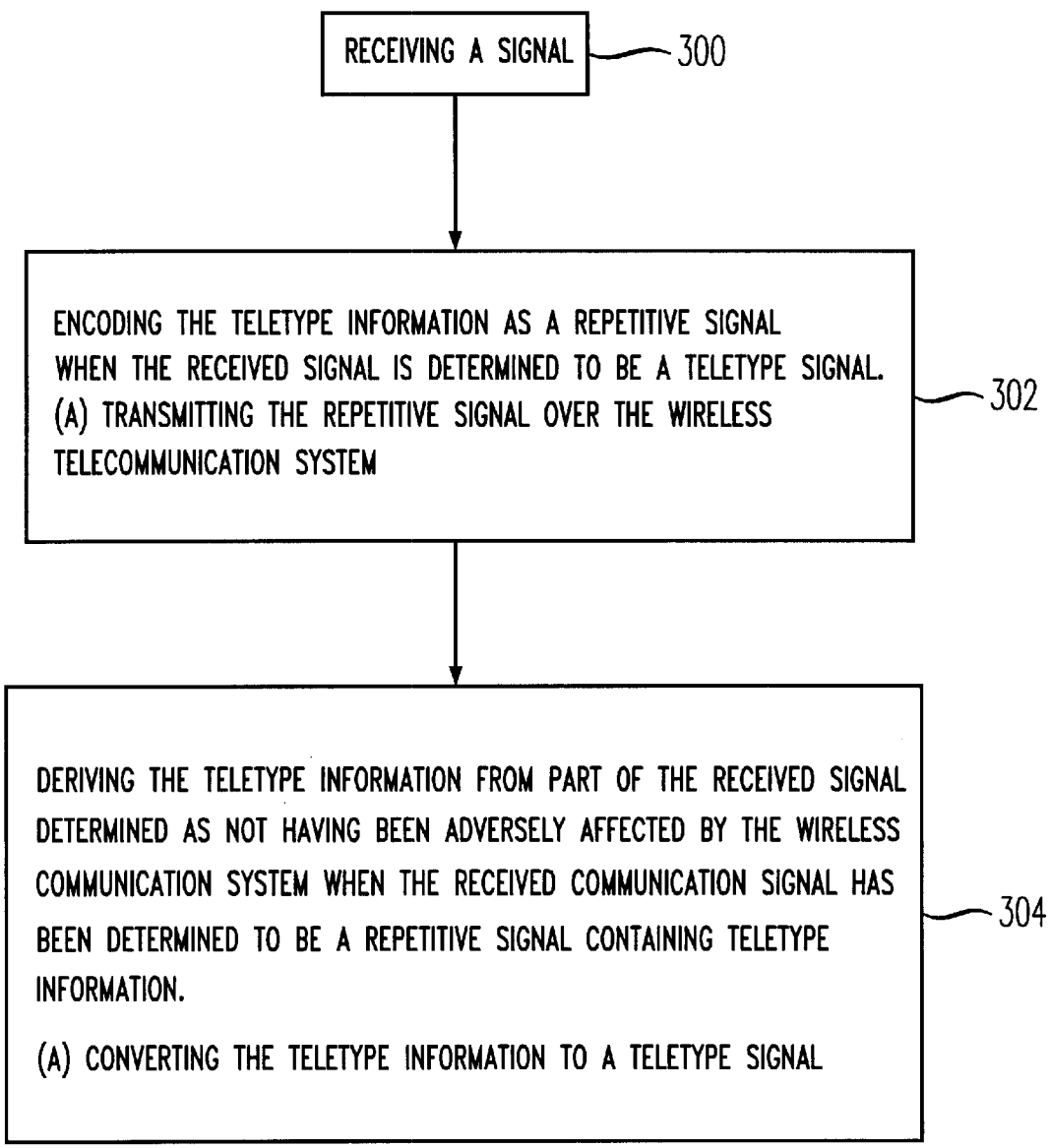
FIG. 3 depicts the method of the present invention.

Referring to FIG. 3, the method of the present invention is depicted. Although the method of the present invention is discussed from the viewpoint of system operator equipment (i.e., wireless telecommunication equipment 218), it should be readily understood that the method of the present invention can be practiced by user equipment such as mobile 214. In step 300, wireless telecommunication equipment 218 receives a communication signal. The received signal can be a teletype signal from communication link 207 or a repetitive signal carrying teletype information from wireless communication channel 210. The received signal can also be other types of signals (e.g., voice signals) that are typically processed by wireless telecommunication equipment 218.

In step 302 wireless telecommunication equipment 218 encodes the teletype information as a repetitive signal when wireless telecommunication equipment 218 determines that the received signal is a teletype signal carrying teletype information. Wireless telecommunication equipment 218 determines that the received signal is a teletype signal with the use of well known circuitry that can detect teletype signals. For example, when the teletype signals comply with the 45.45 baud Baudot signaling protocol, wireless telecommunication equipment 218 uses detection circuits (e.g., filters) to detect the 1800 Hz tones and the 1400 Hz tones and to detect the rate of switching of the two tones. Thus, when an 1800 Hz tone and a 1400 Hz tone are detected to be switching with respect to each other at a rate of 45.45 baud or less, wireless telecommunication equipment 218 identifies such signals as teletype signals that comply with the 45.45 baud Baudot signaling. Wireless telecommunication equipment 218 is configured to detect other types of teletype signals with the use of similar circuitry.

When wireless telecommunication equipment 218 determines that the received signal is a teletype signal, wireless telecommunication equipment 218 retrieves the teletype information from the teletype signal and encodes such information as a repetitive signal. The teletype information is retrieved by simply applying the coding scheme used by the teletype signaling protocol. For example, for the 45.45 baud Baudot signaling protocol, each 1800 Hz tone detected is retrieved as a "0" bit and each 1400 Hz tone detected is retrieved as a "1" bit. The teletype information is encoded as a repetitive signal. As discussed earlier, the repetitive signal is a string of replicated coded signals.

The repetitive signal is arranged in accordance with a format being followed by the wireless telecommunication system and is fed to a vocoder which is part of wireless telecommunication equipment 218. In one particular format of the wireless system, the repetitive signal is represented by blocks of information (e.g., frames) where each block has a certain time duration and information length. For example, in a CDMA wireless telecommunication system the frame has a time duration of 20 milliseconds.

In step 302a the repetitive signal is first fed through a vocoder and is then transmitted over the wireless telecommunication system (e.g., over wireless communication channel 210). The transmitted signal is exposed to all sorts of distorting effects well known in telecommunication systems. Some of these well known distorting effects are phase jitter, frequency deviations, amplitude hits, and multipath distortions. These distorting effects are usually due to the quality of the communication channels of the telecommunication system and the various equipment used by the system. It is well known that telecommunication equipment often add noise (undesired signals) to a communication signal. One quantitative indication of the aggregate effect of the various distortions experienced by the transmitted signal is the system's information error rate (e.g., FER for CDMA systems, BER for TDMA systems). The severity of the distorting effects may vary resulting in more than one information error rate for different communication channels and at different times. The transmitted signal is thus adversely affected by the distorting effects (manifested by a non-zero information error rate) of the wireless telecommunication system.

Still referring to FIG. 3, in step 304, when wireless telecommunication equipment 218 determines that the received signal is a repetitive signal carrying teletype information in accordance with the present invention, wireless telecommunication equipment 218 derives the teletype information from part of the repetitive signal determined as not having been adversely affected by the wireless telecommunication system. In particular, the received signal is first fed to a vocoder. Wireless telecommunication equipment 218 determines that the received signal is teletype information represented as a repetitive signal by first storing the received signal and then dividing the received signal into portions where each portion is equal to a basic time interval (e.g., a frame) of the system in accordance with the format being followed by the wireless telecommunication system. For example, in a CDMA system the received signal is divided into 20 millisecond portions representing the frame length used by the system. Each portion is analyzed to determine whether said portion is consistent with the coding scheme being applied by the system for teletype signals. For example, when the information, start and stop bits of a teletype signals are coded into a complex tone comprising different specifically defined tones, a received signal is analyzed to determine the presence of those specific tones. Several well known signal processing techniques can be used to determine the presence of specific tones in a signal.

Once wireless telecommunication equipment 218 has established that the received signal is a repetitive signal containing teletype information, the method of the present invention uses well known techniques to determine whether any part of the received signal has been adversely affected by the wireless telecommunication system. One technique is to perform spectral analysis of the received signal to determine the amplitude or energy level of all spectral components of the received signal. When the average amplitude or energy level of a portion of the received repetitive signal is determined to be below a threshold, that signal is discarded and is not processed any further. The threshold can be an energy level set by the system operator and/or the manufacturer of the wireless equipment. Other well known techniques can be used to determine whether a received signal has been adversely affected by the wireless telecommunication system.

Any remaining portions of the received signal deemed to have energy levels at or above the threshold are used to decode the teletype information. Blocks of information are decoded from the remaining signals. An analysis of the remaining portions of the received signal is performed so as to decode the teletype information. One possible technique used for decoding the teletype information is to perform a Fast Fourier Transform (FFT) for the remaining signals. The FFT is a well known approach in the field of electrical engineering that efficiently derives the spectral content of a signal, *Introduction to Digital Signal Processing*, John Proakis, McMillan Publishing Company, 1988; the information is decoded based on this derivation. Other well known schemes (e.g., digital filtering) can also be used to decode information from the received signal. The teletype information is then identified from the decoded information. One way of identifying the teletype information from the decoded information is to determine whether certain patterns of information are repeated and then identify the teletype information as the pattern that has the most repetitions. As discussed above, the teletype information is repeated within the repetitive signal and therefore the decoded blocks of information will contain patterns of information that are repeated. For example, for 45.45 baud Baudot signaling the teletype information is represented as 8 bits of information. Thus, the decoded information is separated into 8 bit words of information where each word has a bit pattern. Many of the 8 bit words will have the same bit patterns, i.e., some of the bit patterns will repeat throughout the decoded information. The bit pattern that has the most repetitions is identified as the teletype information. In step 304a, wireless telecommunication equipment 218 converts the teletype information to a teletype signal which it transmits over PSTN 204 for ultimate reception by terminal 200. For the 45.45 baud Baudot signal scheme, a decoded "1" bit is converted to a 1400 Hz tone with a time duration of 22 milliseconds and decoded "0" bit is converted to an 1800 Hz tone having a time duration of 22 milliseconds.

Figure 4:
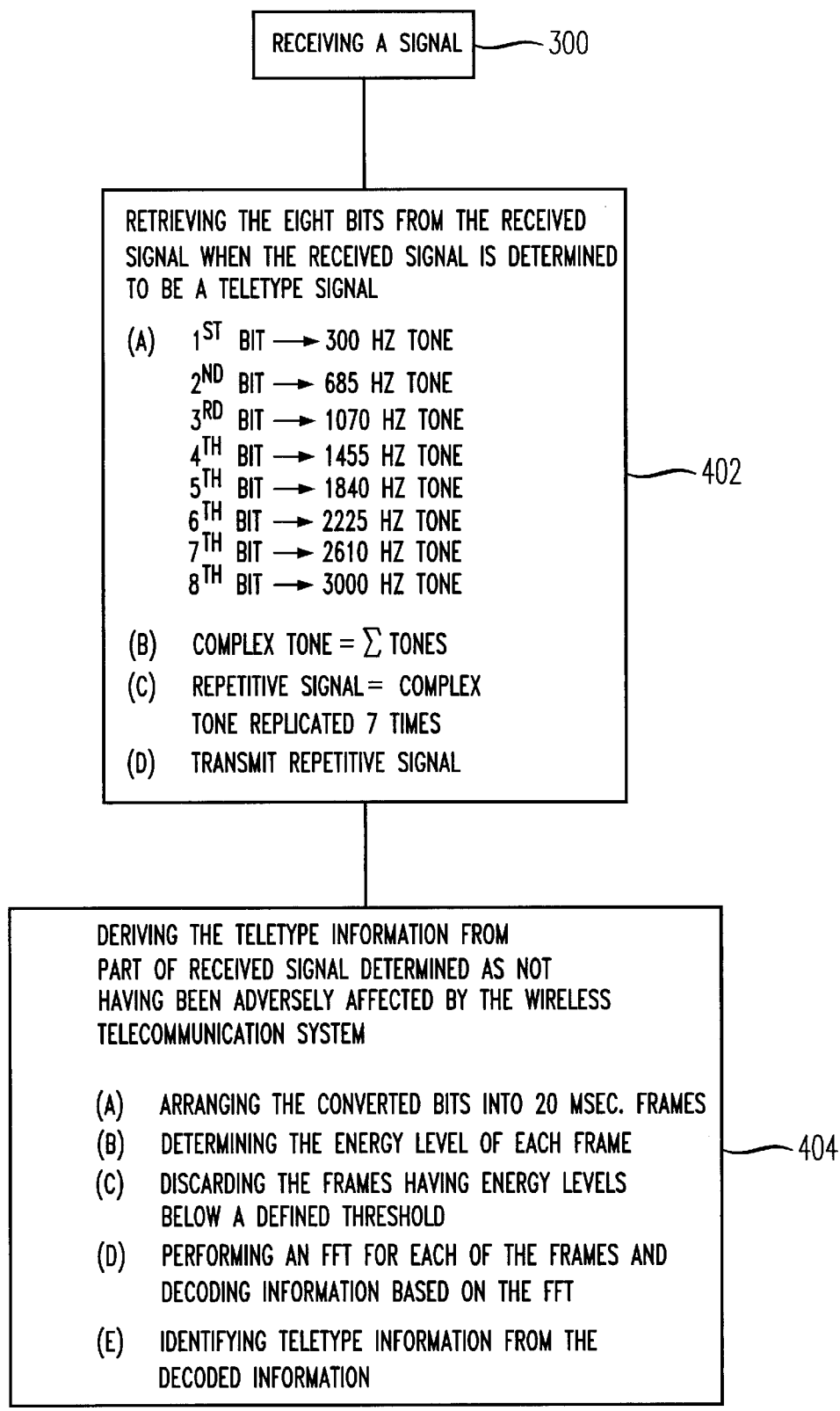
FIG. 4 depicts a particular version of the method of the present invention.
Figure 5:
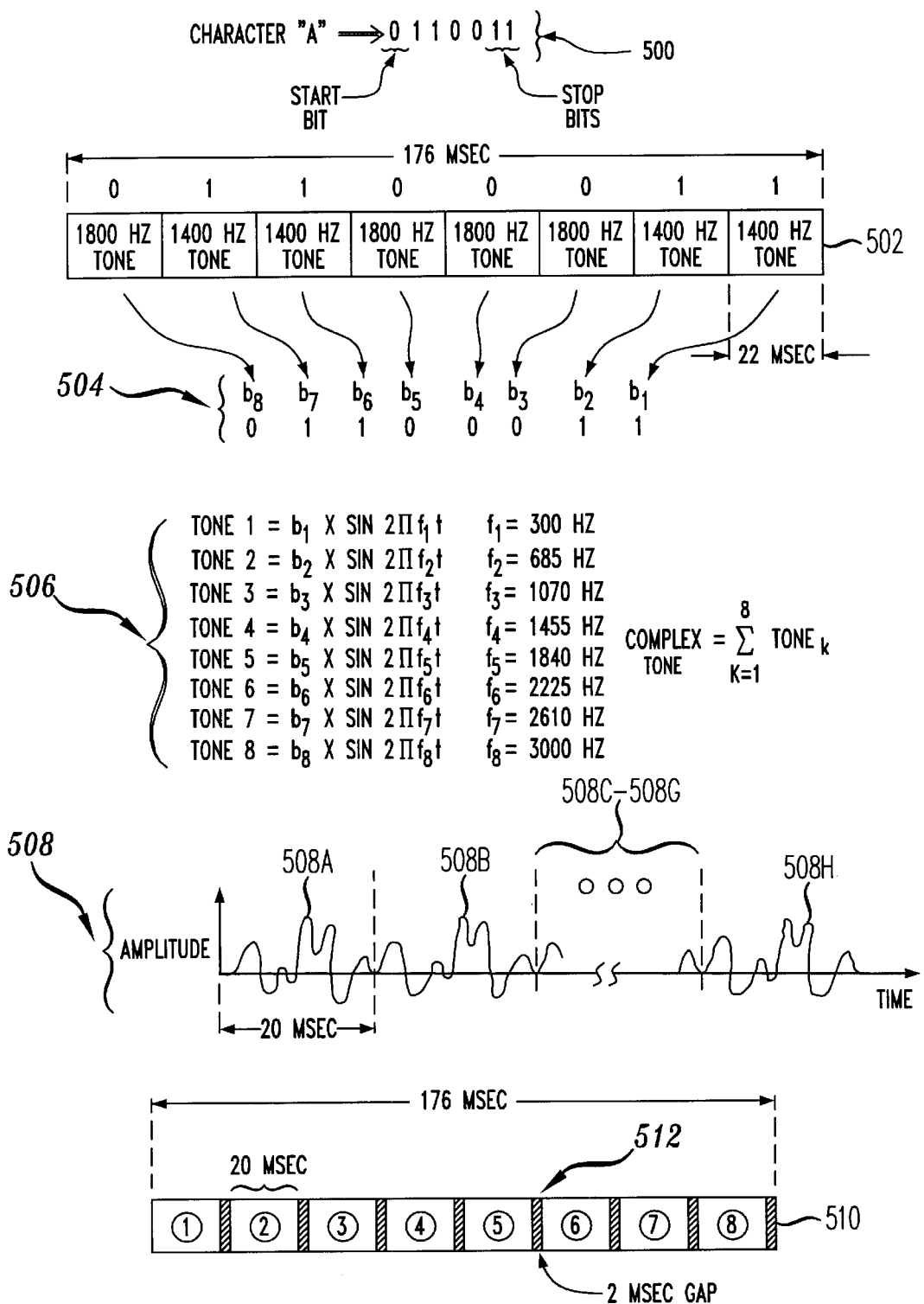
FIG. 5 shows the information structure and coding for various method steps depicted in FIG. 4.

Referring now to FIGS. 4 and 5 there is shown the method for conveying teletype signals complying with the 45.45 baud Baudot signaling scheme over a CDMA wireless telecommunication system. For the sake of simplicity, the conveyance of only one alphanumeric character (i.e., character "A") will be discussed. As shown in FIG. 5, 8 bit word 500 represents character "A."

In step 400 of FIG. 4, wireless telecommunication equipment 218 receives a communication signal. In step 402, wireless telecommunication equipment 218 determines that the received signal is a teletype signal that complies with the 45.45 baud Baudot signaling protocol. Word 502 depicts the Baudot signaling structure of character "A." The 8 bits representing teletype information are retrieved and depicted as bit group 504 of FIG. 5. In step 402a, the retrieved bits are encoded with eight different tones (i.e., sinusoids—sin$2\pi f_o t$; $f_o$ is frequency of tone and t is time) of relatively equal amplitude. In particular, the first bit is represented by a 300 Hz tone, the second bit by a 685 Hz tone, the third bit by a 1070 Hz tone, the fourth bit by a 1455 Hz tone, the fifth bit by a 1840 Hz tone, the sixth bit by a 2225 Hz tone, the seventh bit by a 2610 Hz tone and the eighth bit by a 3000 Hz tone (see element 506 of FIG. 5). Each of the tones has a time duration of 20 milliseconds.

In step 402b, the tones are combined (e.g., added to each other) into one complex tone (508a) having a time duration of 20 milliseconds. The complex tone is then replicated seven times and the replicated complex tones (508b–508h) are concatenated to the original complex tone to form a repetitive signal comprising a string of eight complex tones as depicted by signal 508 of FIG. 5. It should also be noted that the complex tone depicted by signal 508 is shown for illustrative purposes only and is not intended to accurately represent the actual complex tone for character "A". Each of the complex tones is digitized in a well known manner (i.e., sampled at an 8 KHz sampling rate and each sample is digitized) and the digitized information is arranged into a 20 millisecond frame. The eight frames are transmitted at a 45.45 baud rate by inserting a 2 millisecond gap between the transmission of each of the eight frames. During each 2 millisecond gap, no transmission associated with the teletype signal occurs. The insertion of the 2 millisecond gap between each frame makes the frame rate equal to the baud rate of the original teletype signal; that is the eight frames are transmitted in 176 milliseconds (see frames 510 of FIG. 5); similarly the eight bits derived from the teletype signal which have a time duration of 176 milliseconds (see word 502 of FIG. 5). It should be noted that the eight frames need not be transmitted at a 45.45 baud rate. The insertion of the 2 millisecond gap is not all necessary. It should further be noted that the complex tone may be replicated any number of times and thus any number of frames can be used to represent the repetitive signal. The eight frames, each of which represents a digitized complex tone, are fed to a vocoder for further processing and are then transmitted over the wireless telecommunication system.

In step 404 of FIG. 4, the received signal is determined to be teletype information that is represented as a repetitive signal in accordance with the coding scheme of the method of the present invention. Wireless telecommunication equipment 218 determines that the received signal is teletype information by first applying the received signal to a vocoder and then detecting, at the output of the vocoder, the particular tones used to encode the teletype information and the duration of each tone. A received signal containing the particular tones defined in the coding scheme where each detected tone is 20 milliseconds long is most likely a signal containing teletype information in accordance with the method of the present invention. The teletype information is derived from part of the teletype signal determined as not having been adversely affected by wireless telecommunication system.

In particular, in step 404a, the received signal is changed into a bit stream and the bit stream is arranged into 20 millisecond frames. In step 404b the energy level of each of the frames is determined. Determining the energy level of a frame is done in any one of several well known fashions. For example, the amplitude of each frequency component of the signal represented by the frame is determined and the sum of the amplitudes is used to determine the energy level of the signal. Another technique is to calculate the average power or root mean square power (RMS power) of the received signal. Yet another technique is to perform an FFT of the received signal to determine its energy level. In step 404c, the frames which have energy levels below a defined threshold are discarded and any remaining frames are used for further processing. In step 404d a FFT is performed for each of the remaining frames and the results of the FFT are used to decode the information bits. In step 404e the bit pattern for each 8 bit word within the frames is analyzed and the most often appearing bit pattern is identified as the teletype information. The teletype information is converted to a teletype signal in accordance with the 45.45 baud Baudot signaling protocol. The teletype signal is transmitted over a communication system (e.g., PSTN 204) to a teletype terminal (e.g., terminal 200).

I claim:

1. A method for conveying teletype information over a wireless telecommunication system, the method comprising the steps of:

receiving a signal;

encoding teletype information as a repetitive signal when the received signal is determined to be a teletype signal carrying teletype information; and deriving teletype information from part of the received signal determined not to have been adversely affected by the wireless communication system when the received signal has been determined to be a repetitive signal containing teletype information.

2. The method of claim 1 where the step of encoding teletype information further comprises the step of:

transmitting the repetitive signal over the wireless telecommunication system.

3. The method of claim 1 where the repetitive signal is a plurality of replicated coded signals concatenated to each other.

4. The method of claim 1 where the step of deriving teletype information comprises the steps of:

arranging the received signal in accordance with a format being followed by the wireless telecommunication system;

discarding any part of the received signal determined to have been adversely affected by the wireless telecommunication system and keeping any remaining portions of the received signal; and decoding the teletype information from the remaining portions of the received signal.

5. The method of claim 4 where the step of decoding the teletype information comprises the steps of:

performing an analysis of the remaining signals to decode the teletype information;

identifying the teletype information from the decoded information;

converting the teletype information to teletype signals; and transmitting the teletype signals.

6. A method for conveying teletype signals over a wireless telecommunication system comprising the steps of:

receiving a signal;

retrieving teletype information from the received signal and encoding the teletype information as a repetitive signal when it has been determined that the received signal is a teletype signal; and determining the teletype information from part of the received signal determined not to have been adversely affected by the wireless communication system when it has been determined that the received signal is a repetitive signal carrying teletype information.

7. The method of claim 6 wherein the step encoding teletype information comprises the steps of:

representing the derived information with the use of tones;

combining the tones into a complex tone signal;

replicating the complex tone to provide a repetitive signal; and transmitting the repetitive signal over the wireless telecommunication system.

8. The method of claim 6 wherein the step of determining the teletype information comprises the steps of:

arranging the received signal in accordance with a format being followed by the wireless telecommunication system;

discarding portions of the received signal having energy levels below a defined threshold and keeping any remaining portions of the received signal;

performing a FFT for the remaining portions of the received signal;

decoding the teletype information based on the FFT; and identifying as the teletype information the decoded information.

9. The method of claim 8 further comprising the steps of converting the teletype information to a teletype signal and transmitting the teletype signal to a communication system.

10. A method for conveying information carried by teletype signals over a CDMA wireless telecommunication system wherein the teletype signals are analog signals coded as 8 bit words with each word having a start bit, two stop bits and five information bits and each of the bits is represented by either one of two distinct tones with each bit having a time duration of 22 milliseconds resulting in the teletype signals having a baud rate of 45.45, the method comprising the steps of:

receiving a signal;

retrieving information bits, start bits and stop bits from the received signal and encoding said bits into a repetitive signal when it has been determined that the received signal is a teletype signal; and determining the teletype information from part of the received signal determined not to have been adversely affected by the wireless communication system when it has been determined that the received signal is a repetitive signal containing teletype information.

11. The method of claim 10 wherein the step of encoding the bits comprises the steps of:

representing the first bit with a 300 Hz tone, the second bit with a 685 Hz tone, the third bit with a 1070 Hz tone, the fourth bit with 1455 Hz tone, the fifth bit with an 1840 Hz tone, the sixth bit with a 2225 Hz tone, the seventh bit with a 2610 Hz tone and the eighth bit with a 3000 Hz tone where each tone has a duration of 20 milliseconds;

combining the tones into a complex tone having a duration of 20 milliseconds;

replicating the complex tone seven times and concatenating the replicated tones and the complex tones to form a repetitive signal comprising a string of eight complex tones;

digitizing the repetitive signal into digital information; and arranging the digital information into eight frames each of which is 20 milliseconds in duration.

12. The method of claim 11 further comprising the steps of:

transmitting the eight frames over the CDMA wireless telecommunication system with a 2 millisecond gap between each transmitted frame.

13. The method of claim 10 where the step of determining the teletype information comprises the steps of:

arranging the received signal into 20 millisecond frames;

determining the energy level of each frame;

discarding the frames having energy levels below a defined threshold and keeping any remaining frames;

performing a FFT for each of the remaining frames;

decoding the information bits, stop bits and start bits for each of the remaining frames based on the corresponding FFT;

selecting the information bits, start bits and stop bits from the frame having a bit pattern that is repeated the most;

converting the selected bits into a teletype signal; and transmitting the teletype signal.

14. In a transmitter of a wireless telecommunication system, a method for transmitting teletype information to a receiver of said wireless telecommunication system, the method comprising the steps of:

(A) receiving an input signal;

(B) encoding teletype information as a repetitive signal if the input signal is determined to be a teletype signal carrying teletype information; and (C) transmitting the repetitive signal to the receiver configured to (1) determine whether the transmitted signal is the repetitive signal containing teletype information and (2) derive teletype information from part of the transmitted repetitive signal if said part is determined not to have been adversely affected by the wireless communication system.

15. The method of claim 14, wherein the repetitive signal is a plurality of replicated coded signals concatenated to each other.

16. The method of claim 14, wherein step (B) comprises the steps of:

(B1) encoding teletype information with the use of tones;

(B2) combining the tones into a complex tone; and (B3) replicating the complex tone to provide the repetitive signal.

17. The method of claim 16, wherein the wireless telecommunication system is a CDMA wireless telecommunication system and the teletype signal is a signal coded as 8-bit words and step (B1) comprises the step of:

for each 8-bit word, representing the first bit with a 300 Hz tone, the second bit with a 685 Hz tone, the third bit with a 1070 Hz tone, the fourth bit with 1455 Hz tone, the fifth bit with an 1840 Hz tone, the sixth bit with a 2225 Hz tone, the seventh bit with a 2610 Hz tone, and the eighth bit with a 3000 Hz tone.

18. The method of claim 16, wherein step (B3) comprises the steps of:

(B3a) replicating the complex tones seven times; and (B3b) concatenating the replicated tones and the complex tone to form the repetitive signal comprising a string of eight complex tones.

19. In a receiver of a wireless telecommunication system, a method for receiving teletype information from a transmitter of said wireless telecommunication system, the method comprising the steps of:

(A) receiving a signal from the transmitter;

(B) determining whether part of the received signal is a repetitive signal containing teletype information; and (C) deriving teletype information from the part of the received signal corresponding to the repetitive signal if said part is determined not to have been adversely affected by the wireless telecommunication system.

20. The method of claim 19, wherein the repetitive signal is a plurality of replicated coded signals concatenated to each other.

21. The method of claim 19, wherein step (C) comprises the steps of:

(C1) discarding part of the received signal determined to have been adversely affected by the wireless telecommunication system and keeping the remaining portion of the received signal; and (C2) decoding teletype information from the remaining portion of the received signal.

22. The method of claim 21, wherein step (C1) comprises the steps of:

(C1a) arranging the received signal into frames;

(C1b) determining the energy level of each frame; and (C1c) discarding the frames having energy levels below a defined treshold.

23. The method of claim 21, wherein step (C2) comprises the steps of:

(C2a) performing an FFT for the remaining poritons of the received signal;

(C2b) obtaining decoded information based on the FFT;

(C2c) deriving teletype information from the decoded information; and (C2d) generating a teletype signal representing the teletype information.

24. The method of claim 19, wherein the wireless communication system is a CDMA wireless telecommunication system.

* * * * *